US006571820B2

(12) United States Patent
Glovatsky et al.

(10) Patent No.: US 6,571,820 B2
(45) Date of Patent: Jun. 3, 2003

(54) CONCEALED AIR VENTS

(75) Inventors: Andrew Zachary Glovatsky, Plymouth, MI (US); Robert Edward Belke, West Bloomfield, MI (US); Jay DeAvis Baker, Dearborn, MI (US); Joseph Mario Giachino, Farmington Hills, MI (US); Lakhi Nandlal Goenka, Ann Arbor, MI (US); Myron Lemecha, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 122 days.

(21) Appl. No.: 09/904,231

(22) Filed: Jul. 12, 2001

(65) Prior Publication Data

US 2002/0007852 A1 Jan. 24, 2002

Related U.S. Application Data

(60) Provisional application No. 60/218,493, filed on Jul. 14, 2000.

(51) Int. Cl.[7] .............................................. F61K 1/00
(52) U.S. Cl. ....................................... 137/353; 251/294
(58) Field of Search ................................ 251/294, 296, 251/369, 901; 137/67, 353

(56) References Cited

U.S. PATENT DOCUMENTS

| 3,991,917 A | * 11/1976 | Moen ........................ 222/486 |
| 4,280,753 A | 7/1981 | Neubauer |
| 4,484,728 A | * 11/1984 | Moore ........................ 251/294 |
| 4,575,200 A | 3/1986 | Humiston |
| 5,222,200 A | 6/1993 | Adler |
| 5,222,699 A | 6/1993 | Albach et al. |
| 5,243,830 A | * 9/1993 | Ito et al. ........................ 62/344 |
| 5,639,065 A | 6/1997 | Lin |
| 5,692,585 A | 12/1997 | Kazuro et al. |
| 5,713,557 A | 2/1998 | Kang |
| 5,810,291 A | 9/1998 | Geiger et al. |
| 5,901,943 A | * 5/1999 | Tsunoda ........................ 251/294 |
| 5,913,494 A | 6/1999 | Burbridge et al. |
| 5,918,834 A | 7/1999 | Sommer et al. |
| 5,927,651 A | 7/1999 | Geders et al. |
| 5,931,422 A | 8/1999 | Geiger et al. |
| 5,941,480 A | 8/1999 | Wille |
| 5,947,417 A | 9/1999 | Cameron |
| 5,947,422 A | 9/1999 | Wille |
| 5,958,803 A | 9/1999 | Geiger |
| 5,975,463 A | 11/1999 | Gruensfelder et al. |
| 5,979,828 A | 11/1999 | Gruendsfelder et al. |
| 5,988,567 A | 11/1999 | Wille |
| 6,027,074 A | 2/2000 | Cameron et al. |
| 6,048,581 A | 4/2000 | Waldrop, III |
| 6,053,477 A | 4/2000 | Price |
| 6,068,215 A | 5/2000 | Gruensfelder et al. |
| 6,076,766 A | 6/2000 | Gruensfelder |
| 6,089,505 A | 7/2000 | Gruensfelder et al. |
| 6,092,764 A | 7/2000 | Geders et al. |
| 6,142,501 A | 11/2000 | Fogo et al. |
| 6,146,265 A | * 11/2000 | Greenwald ........................ 454/155 |
| 6,193,025 B1 | 2/2001 | Nakagawa |
| 6,213,572 B1 | 4/2001 | Linkner, Jr. et al. |
| 6,230,949 B1 | 5/2001 | O'Connell et al. |
| 6,234,284 B1 | 5/2001 | Ashman et al. |
| 6,234,585 B1 | 5/2001 | Harris et al. |

* cited by examiner

*Primary Examiner*—John Fox
(74) *Attorney, Agent, or Firm*—Brinks Hofer Gilson & Lione

(57) ABSTRACT

A vent assembly that can be concealed when in a closed configuration is provided in one embodiment, the vent assembly comprises a base member and a guide member secured to a mounting surface of a duct or other passageway. A flexible rod is fixedly attached to the base member and slideably disposed within a channel defined by the guide member. A panel is disposed on or around the flexible rod and between the base and guide members. An actuator is able to deform the rod such that the panel moves away from the terminal opening of the duct, thereby opening the vent. A fluid distribution system incorporating vent assemblies in accordance with the present invention is also provided.

19 Claims, 4 Drawing Sheets

CONCEALED AIR VENTS

REFERENCE TO PREVIOUS APPLICATION

This application claims the benefit of U.S. Provisional Application No. 60/218,493 filed on Jul. 14, 2000.

FIELD OF THE INVENTION

The present invention relates to vents and fluid distribution systems. More particularly, the invention relates to air vents that are concealed when not allowing air to escape from a connected passageway.

BACKGROUND OF THE INVENTION

Fluid distribution systems typically contain a plurality of passageways, or ducts, that terminate in an opening A vent can be placed on the opening and used to regulate the passage of the fluid into a surrounding environment. A common example of such an arrangement is the air distribution system in a motor vehicle. In conventional vehicle air systems, each of the various vents contain adjustable grills that a vehicle occupant can manipulate to control and regulate the flow of air into the passenger compartment.

While the use of these vents allow for effective regulation of air flow, they require the presence of a complex structure within a vehicle component, such as the instrument panel or interior door cover. Furthermore, the structure of conventional vents can disrupt the visual appearance of the vehicle components, leaving an undesirable aesthetic effect.

Continuous moldline technology provides a continuous, smooth surface that can deform or stretch in a selective manner. This technology has been used in aircraft surfaces to reduce turbulence and drag due to gaps and discontinuities that arise in aircraft control surfaces upon movement of the surface. Individual moldline structure units provide distinct flexible surfaces that can be selectively activated to deform

SUMMARY OF THE INVENTION

The present invention provides a vent assembly for use with a duct or other passageway. The vent assembly utilizes one or more moldline structure units to achieve a selective opening of the vent. Furthermore, the vent can be concealed when not allowing a fluid, such as air, to escape from the passageway via the vent.

In a preferred embodiment, the vent assembly includes a mounting surface that defines an opening in communication with the passageway, a base member and a guide member that are both secured to the mounting surface. A flexible rod is attached to the base member and passed through a channel in the guide member, such that the rod can move within the channel. A panel is disposed around the rod and between the base and guide members. The panel is larger than the opening in the mounting surface and can sealably close the opening. An actuator is operably related to the rod such that the actuator is able to induce deformation of the flexible rod. The deformation of the rod causes the panel to move away from the opening, thereby allowing air or another fluid to exit the passageway.

The panel and other parts of the assembly can be covered with a flexible coating. In one embodiment, the coating comprises a portion of a vehicle console, such as an instrument panel or interior door panel. In this embodiment, the console conceals the vent when air delivery is not desired, and reveals the vent when delivery is desired.

The present invention also provides a fluid distribution system that incorporates one or more vent assemblies of the present invention. In one embodiment, the system includes a plenum for selectively delivering a fluid among a plurality of independent passageways, and a controller operably connected to the plenum. The controller can be further connected to the actuator of one or more vent assemblies such that the panel of appropriate vent(s) is moved to allow fluid to escape the passageway when the controller operates the plenum to allow fluid to move into the passageway. Alternatively, a second controller can be connected to the actuator.

BRIEF DESCRIPTION OF THE DRAWINGS

FIG. 2 presents a perspective view of a vent assembly in accordance with a first preferred embodiment of the present invention.

FIG. 2A illustrates the assembly in a closed configuration, while

FIG. 4 illustrates a perspective view of a fluid distribution system in accordance with a preferred embodiment of the present invention.

FIG. 4A illustrates several vent assemblies of the system in closed configurations, while

DETAILED DESCRIPTION OF THE INVENTION

The following description of preferred embodiments of the invention provides examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

Figure 1:
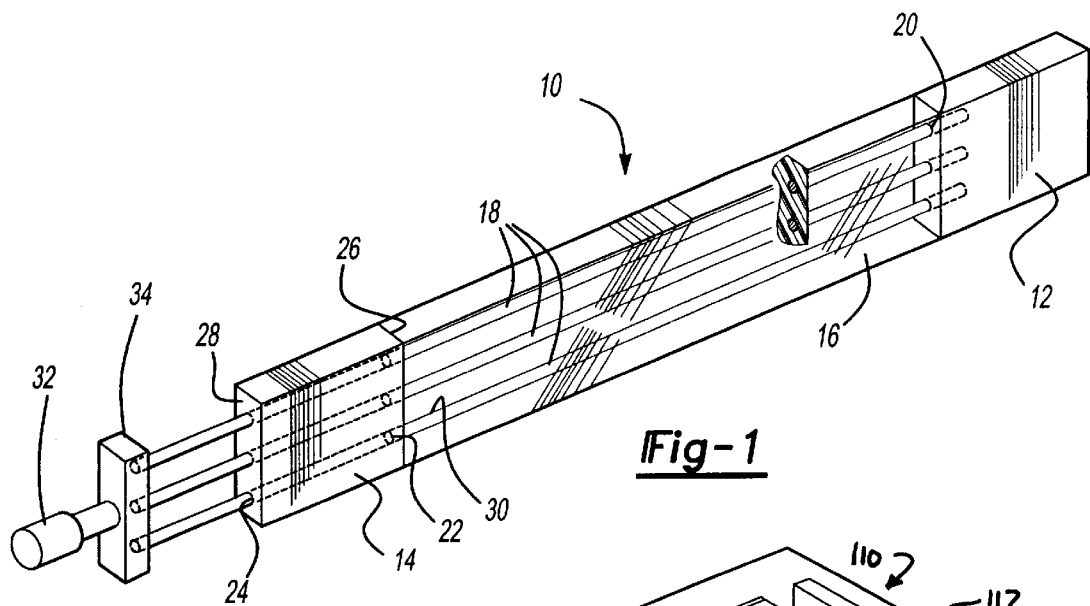
FIG. 1 illustrates a perspective view of a moldline structure unit suitable for incorporation into the vent assembly of the present invention.

FIG. 1 illustrates an example of a moldline structure unit 10 that can be utilized in the present invention. The unit 10 includes a base member 12, a guide member 14, and a panel 16 extending between the base 12 and guide 14 members. One or more flexible rods 18 extend through the panel 16 and preferably into both the base 12 and guide 14 members. The base 12 and guide 14 members are preferably secured to a surface, which will be developed more fully below.

The base member 12 preferably defines one or more openings 20 that receive and retain one end of the rods 18. In the base member 12, the openings 20 preferably retain the rods 18 such that the rod 18 cannot move within the opening 20. The rod 18 may be secured in the opening 20 by any of a variety of means, including an adhesive bond between the rod 18 and base member 12, mechanical attachment, such as crimping or by way of a fastener, or by any other suitable attachment means. Alternatively, the rod can be secured to a face of the base member 12.

The guide member 14 defines openings 22 that provide a channel 24 from a first face 26 to an opposing second face 28 of the member 14. Each opening 22 receives a second end of a rod 18 and allows the rod 18 to move freely within the channel 24. Preferably, a free end of each rod 18 extends past the second edge 28 so that the panel 16 can be deformed by passing a portion of the free end into the channel 24, as will be developed more fully below.

The panel 16 preferably comprises a flexible polymeric material that surrounds the portion of the rods 18 that lies between the base 12 and guide 14 members. Particularly preferable, the panel 16 comprises an elastomeric material. Alternatively, the panel 16 can comprise any flexible material that is able to stretch or deform to a desired degree and return to its original form. The appropriate degree of ability to deform will depend on the application. For applications of the present invention, the panel 16 is preferably capable of stretching to 150% of its normal length and still be able to return to its original length and form. Examples of suitable materials for use in the flexible panel of the present invention include rubber, silicones, silicone rubbers, polyurethanes, and flexible acrylics. Also alternatively, the panel 16 can comprise a rigid material, such as a plastic. The composition of the panel 16 need only be such that the desired flexibility of the rod 18, which allows the vent assembly to open and close, can be achieved.

The panel 16 defines one or more cavities 30 that receive the rods 18. Preferably, the panel 16 defines one cavity 30 for each rod 18. Alternatively, the panel 16 may define a single relatively large cavity that receives a plurality or all of the rods 18. The cavities 30 receive the rods 18 in a manner that allows the rods 18 to move within the cavities 30. That is, the panel 16 is preferably able to slide over the rods 18, via the cavities 30, as the rods 18 are pushed or pulled into or out of the cavities 30.

The rods 18 are also flexible in nature. Preferably, the rods 18 comprise a composite material that is sufficiently flexible to allow the panel 16 to stretch to its full capacity when comprised of a flexible material. Also preferable, the rods 18 are able to bend and/or deform in a manner that confers a smooth, continuous shape to the panel 16 whether the panel 16 be flexible or rigid. Composite materials such as carbon fiber and polymeric materials, provide the desired flexibility when acted upon by an external mechanical force, such as a pushing or pulling action, which will be developed more fully below. As an alternative to composite materials, the rods 18 can comprise any material that possesses the desired flexibility. Examples of suitable alternative materials for the rods 18 include aluminum, steel, and alloyed iron.

The rods 18 preferably comprise elongate, cylindrical shaped members that can be secured to the base member 12 and can be threaded through the channel(s) 24 of the guide member 14 and the cavity(ies) 30 of the panel 16. Alternatively, any other suitable shape, such as the flexible plates described in U.S. Pat. No. 5,810,291 to Geiger, et al., for a CONTINUOUS MOLDLINE TECHNOLOGY SYSTEM, which is hereby incorporated by reference in its entirety, can be utilized. Also alternatively, a series of rods can be positioned in parallel or twisted together. Of course, the shape of the channel(s) 24 and cavity(ies) 30 is preferably complimentary to that of the rods 18 such that the desired flexibility can be achieved The unit 10 also preferably includes an actuator 32. The actuator 32 is a device capable of inducing deformation of the rods 18. The type of actuator used will depend on the nature of the rods 18. For example, a mechanical actuator can be utilized to push or pull the rods 18 such that the desired deformation is achieved. In this embodiment, the actuator 32 preferably comprises a motor or other mechanical device. Particularly preferred, the actuator 32 is a motor having a cam 34 that can induce deformation in the rods 18. Alternatively, any other suitable actuator that can induce the desired deformation can be utilized, such as actuators employing hydraulic, pneumatic or electrical means of inducing movement.

The actuator 32 can interact with the unit 10 to achieve the desired deformation in a variety of ways. For example, as shown in FIG. 1, the actuator 32 can be attached to the free end of each rod 18 such that the actuator 32 can push or pull the rod 18 into or out of the channel 24 and cavities 30. Alternatively, the cam 34 can be positioned such that it pushes or pulls the rod 18, either at the free end or at another location along its length, such that the rod 18 and panel 16 deform. Also, it is preferred that the actuator 32 be able to induce deformation in all rods present in the unit 10. Alternatively, the actuator 32 may induce stretching in only one rod, or a subset of rods.

FIG. 2 illustrates a first preferred embodiment of a vent assembly 100 in accordance with the present invention. The assembly incorporates a moldline structure unit 110. Accordingly, like reference numbers in FIG. 2 refer to similar features and/or components shown in FIG. 1. In FIG. 2, panel A illustrates a vent assembly 100 in a closed configuration, i.e., a configuration that substantially prevents fluid to escape via the vent. Panel B illustrates a vent assembly 100 in an open configuration, i.e. a configuration that allows fluid to escape via the vent As shown in the figure, the vent assembly 100 includes a moldline structure unit 110 positioned adjacent the terminus of a duct or passageway 150. The moldline structure unit 110 is secured to a mounting surface 152 that defines an opening 154 that is in fluid communication with the duct or passageway 150. Both the base 112 and guide 114 members of the moldline structure unit 110 are preferably secured to the mounting surface 150. For these connections, any suitable securement means, such as a fastener and/or an adhesive, can be utilized.

The panel 116 is preferably larger in size than the opening 154. This allows the panel to effectively block fluid from escaping from the opening 154 when the panel 116 is pressed against the mounting surface 152.

To facilitate this blocking of fluid escape, a seal 156 can be disposed between the mounting surface 152 and panel 116. Preferably, the seal 154 is disposed around the opening 154 and is preferably positioned on the mounting surface 152 such that a closure is created when the panel 116 is placed adjacent the mounting surface 152. Preferably, the seal 156 comprises a rubber or other elastomeric gasket-type element. Alternatively, any suitable sealing element can be used. The specific type of seal used will depend on the fluid being handled by the duct or passageway 150. Rubber and other elastomeric seals are suitable for air handling ducts.

Figure 2A:
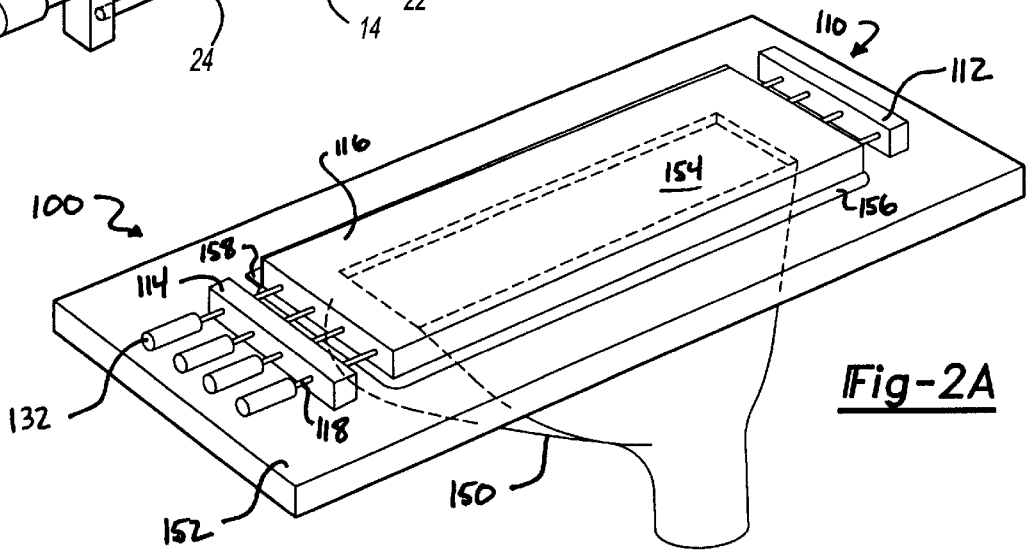
Figure 2B:
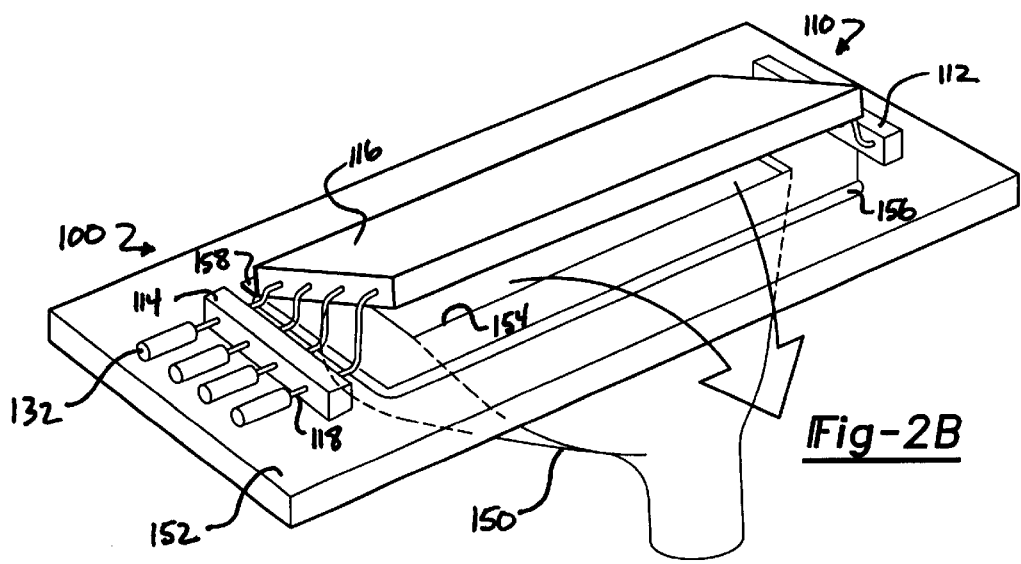
FIG. 2B illustrates the vent assembly in an open configuration.

To facilitate opening and closing of the vent assembly 100, a hinge 158 can be used. Preferably, as shown in FIG. 2, the hinge comprises a projection on the mounting surface 152 and a recess in the panel 116. In this embodiment, the recess receives the projection in a manner that allows the panel 116 to rotate, at least partially, about the projection. Alternatively, any conventional hinge or hinge assembly can be utilized. Also preferable, the hinge 158 is disposed on only one side of the panel 116. In this arrangement, the hinge 158 ensures that one side of the panel 116 remains adjacent the mounting surface 152 when the vent assembly 100 is moved to the open configuration The vent assembly 100 is operated by deforming the rods 118 of the moldline structure unit 110. As illustrated in FIGS. 2A and 2B, the actuator 132 deforms the rod 118 by appropriate action, which forces the panel 116 to move from its position directly adjacent the mounting surface 152. This movement breaks the sealable relationship between the seal 156 and the panel 116, and allows fluid to exit the duct or passageway 150 via the vent assembly 100. Preferably, the actuator 132 is able to deform the rod 118 in a manner that allows the panel 116 to move between at least two positions a first position in which the panel 116 sealably closes the opening 154 and a second position in which the panel 116 is moved away from the opening 154 thereby allowing a fluid to exit the duct or passageway 150 via the opening 154.

It should be noted that one or a plurality of moldline structure units can be used in a single vent assembly. Also, as shown in FIG. 2, a plurality of actuators 132 can be used in a single moldline structure unit 110.

Figure 3:
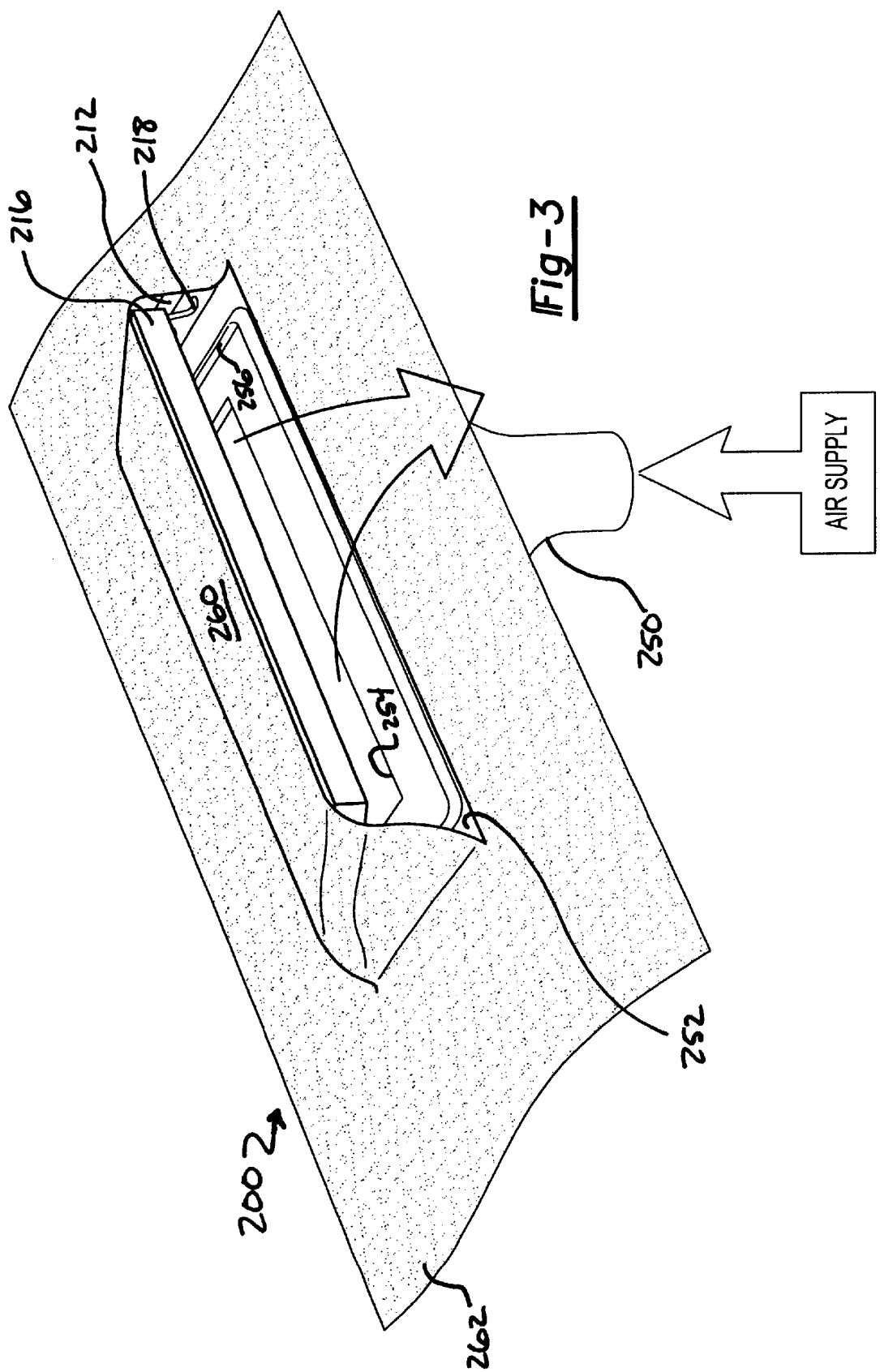
FIG. 3 illustrates a perspective view of a vent assembly in accordance with a second preferred embodiment of the present invention.

FIG. 3 illustrates a vent assembly 200 in accordance with a second preferred embodiment of the present invention. This embodiment is similar to the first preferred embodiment, except as detailed below. Accordingly, like reference numbers in FIG. 3 refer to similar features and/or components illustrated in FIG. 2 for the first preferred embodiment In this embodiment, a flexible coating 260 is disposed on the panel 216 of the moldline structure unit 210. As shown in the figure, the coating 260 preferably covers the entire assembly. Alternatively, the coating 260 can be disposed on only a portion of the moldline structure unit 210, such as the panel 216. The extent of coverage of the unit 210 by the coating 260 can be optimized based on the degree to which it is desired to conceal the unit 210 when the vent assembly 200 is in a closed configuration.

The flexible coating 260 is preferably comprised of a material that is sufficiently flexible to allow the vent assembly 200 to move between open and closed configurations, as described above. Suitable materials include polypropylene, nylon, polypropylene/nylon blends, thermoplastic olefins, and elastomeric materials having the desired flexibility.

Figure 4A:
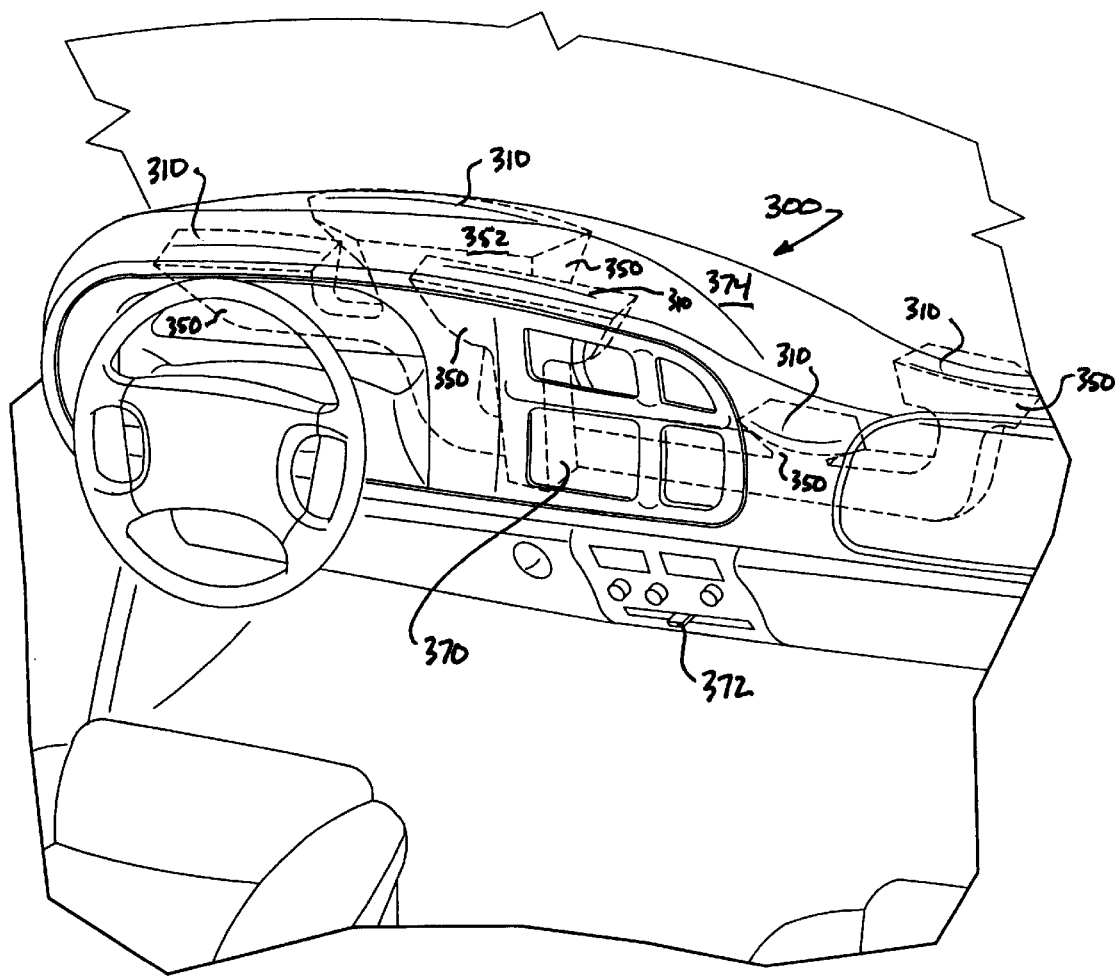
Figure 4B:
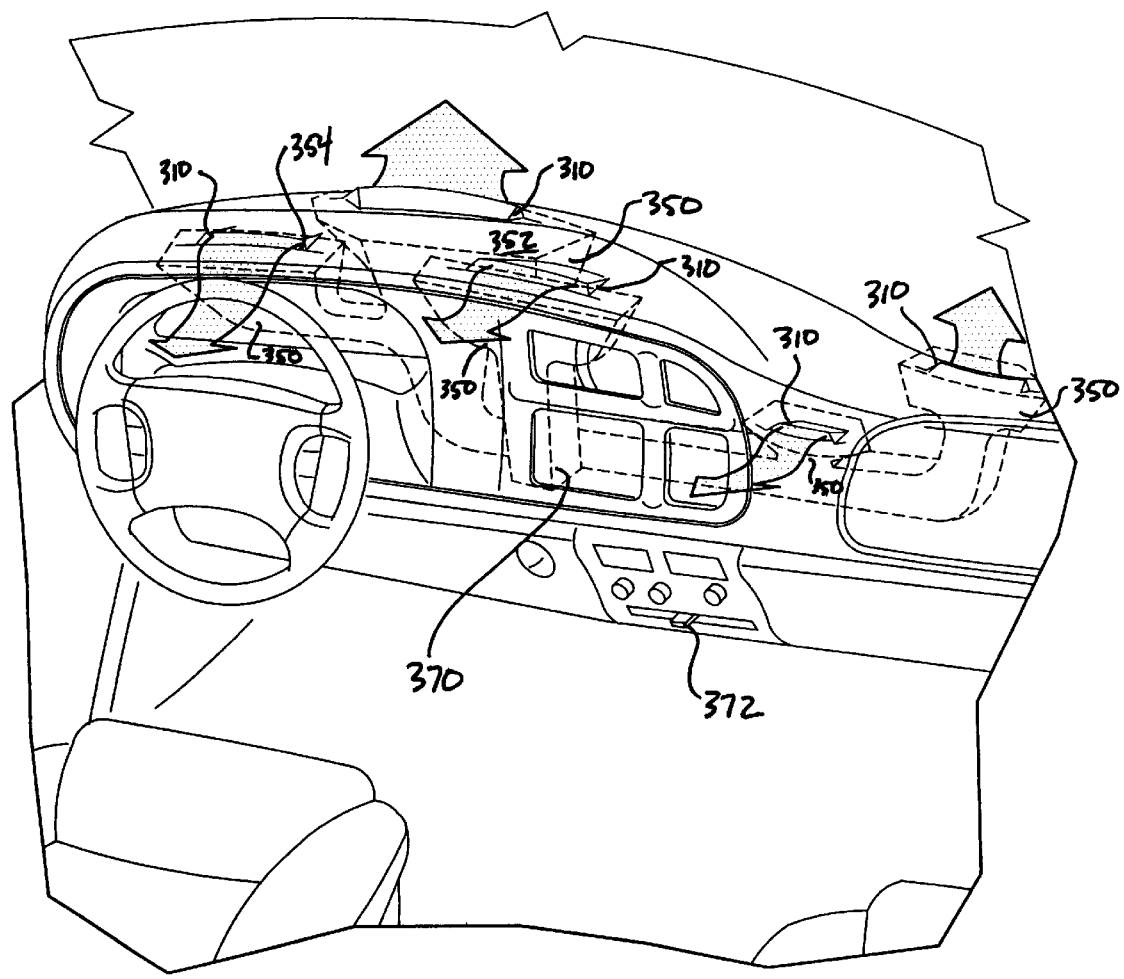
FIG. 4B illustrates the assemblies in open configurations.

Preferably, the flexible coating 260 comprises a portion of a suitable vehicle console 262. As used herein, the term console refers to any vehicle component, such as an instrument panel, armrest, interior door panel, fold-down tray, or between-the-seats console FIG. 4 illustrates a fluid distribution system 300 in accordance with a preferred embodiment of the present invention. Like reference numbers in FIG. 4 refer to similar features and/or components shown in the previous figures. In FIG. 4, panel A shows a plurality of vent assemblies in a closed configuration, while panel B illustrates the vents in open configurations.

As shown in the figure, the system 300 comprises a plurality of ducts and/or passageways 350 emanating from a central plenum 370. A series of controls 372 are operably connected to the plenum 370 such that an occupant of the vehicle can control the selective distribution of the fluid through the passageways 350 by manipulating the controls 372. Also, a flexible vehicle console 374 overlays the moldline structure units 310 in a manner that allows the vents to open and close.

The controls 372 can be further operably connected to the actuator of individual moldline structure units 310 such that manipulation of the controls 372 to change the plenum 370 to a configuration that allows air to flow into the passageways 350 also induces the actuator of the unit 310 associated with the appropriate passageway 350 to cause the rod to deform. This deformation moves the panel away from the opening 354, which interrupts the sealable relationship between the panel and mounting surface 352 and places the vent in an open configuration. As a consequence, air is able to escape from the passageway 350.

Alternatively, the control 372, or an independent set of controls (not illustrated) can be independently connected to the actuators of the moldline structure units 310 such that an occupant of the vehicle can control the configuration of the vents independently of the configuration of the plenum 370.

The foregoing disclosure is the best mode devised by the inventors for practicing the invention. It is apparent, however, that several variations in accordance with the present invention may be conceivable to one of ordinary skill in the relevant art. Inasmuch as the foregoing disclosure is intended to enable such person to practice the instant invention, it should not be construed to be limited thereby, but should be construed to include such aforementioned variations. As such, the present invention should be limited only by the spirit and scope of the following claims.

We claim:

1. A vent assembly for regulating the flow of fluid from a passageway, comprising,
    a mounting surface defining an opening in fluid communication with said passageway;
    a base member secured to the mounting surface;
    a guide member secured to the mounting surface and having first and second opposing faces, the guide member defining a channel extending between the first and second opposing faces;
    at least one flexible rod having first and second ends, the first end being fixedly attached to the base member and the second end being disposed in the channel and being capable of slideable movement within the channel;
    a panel disposed around the rod and between the base and guide members, the panel being larger than the opening; and
    an actuator adapted to induce deformation of the rod;
    wherein deformation of the rod causes the panel to move between a first position in which the panel sealably closes the opening and a second position in which the panel is moved away from the opening, thereby allowing said fluid to exit said passageway via the opening.

2. A vent assembly in accordance with claim 1, further comprising a sealing member disposed on the mounting surface and around the opening.

3. A vent assembly in accordance with claim 1, further comprising a hinge secured to the mounting surface and operably connected to the panel such that one side of the panel remains adjacent the mounting surface when the panel is moved to the second position.

4. A vent assembly in accordance with claim 3, wherein the hinge comprises a projection and wherein the panel defines a recess for receiving the projection such that the panel is able to rotate with respect to the projection.

5. A vent assembly in accordance with claim 1, wherein the panel is comprised of a flexible material.

6. A vent assembly in accordance with claim 5, wherein the flexible material is an elastomeric material.

7. A vent assembly in accordance with claim 1, wherein the panel is comprised of a rigid material.

8. A vent assembly in accordance with claim 1, further comprising a second flexible rod.

9. A vent assembly in accordance with claim 8, further comprising a second actuator adapted to induce deformation of the second flexible rod.

10. A vent assembly in accordance with claim 1, further comprising a flexible coating disposed on the panel.

11. A vent assembly in accordance with claim 10, wherein the flexible coating comprises a portion of a vehicle console.

12. A fluid distribution system, comprising:
a passageway;
a plenum adapted to selectively allow said fluid to move into the passageway; and
a controller operably connected to the plenum;
a mounting surface defining an opening in fluid communication with the passageway; and
a moldline structure unit, comprising a base member secured to the mounting surface, a guide member secured to the mounting surface and having first and second opposing faces, the guide member defining a channel extending between the first and second opposing faces, at least one flexible rod having first and second ends, the first end being fixedly attached to the base member and the second end being disposed in the channel and being capable of slideable movement within the channel, a panel disposed around the rod and between the base and guide members, the panel being larger than the opening, and an actuator adapted to induce deformation of the rod;
wherein deformation of the rod causes the panel to move between a first position in which the panel sealably closes the opening and a second position in which the panel is moved away from the opening, thereby allowing said fluid to exit the passageway via the opening.

13. A fluid distribution in accordance with claim 12, wherein the actuator is operably connected to the controller such that the panel is moved to the second position when the controller operates the plenum to allow said fluid to move into the passageway.

14. A fluid distribution system in accordance with claim 12, further comprising a second passageway, wherein the plenum is further adapted to selectively allow said fluid to move into the second passageway.

15. A fluid distribution system in accordance with claim 14, further comprising a second mounting surface defining a second opening in fluid communication with the second passageway, and further comprising a second moldline structure unit secured to the second mounting surface.

16. A fluid distribution system in accordance with claim 12, further comprising a second controller adapted to activate the actuator to induce deformation of the rod.

17. A fluid distribution system in accordance with claim 12, further comprising a flexible coating disposed on the panel.

18. A fluid distribution system in accordance with claim 17, wherein the flexible coating comprises a portion of a vehicle console.

19. A fluid distribution system in accordance with claim 18, wherein the vehicle console comprises an instrument panel.

* * * * *